Feb. 13, 1962     H. HECHT     3,021,097
AUTOMATIC PILOT FOR DIRIGIBLE CRAFT
Filed June 28, 1956     5 Sheets-Sheet 1

INVENTOR
HERBERT HECHT
BY
ATTORNEY

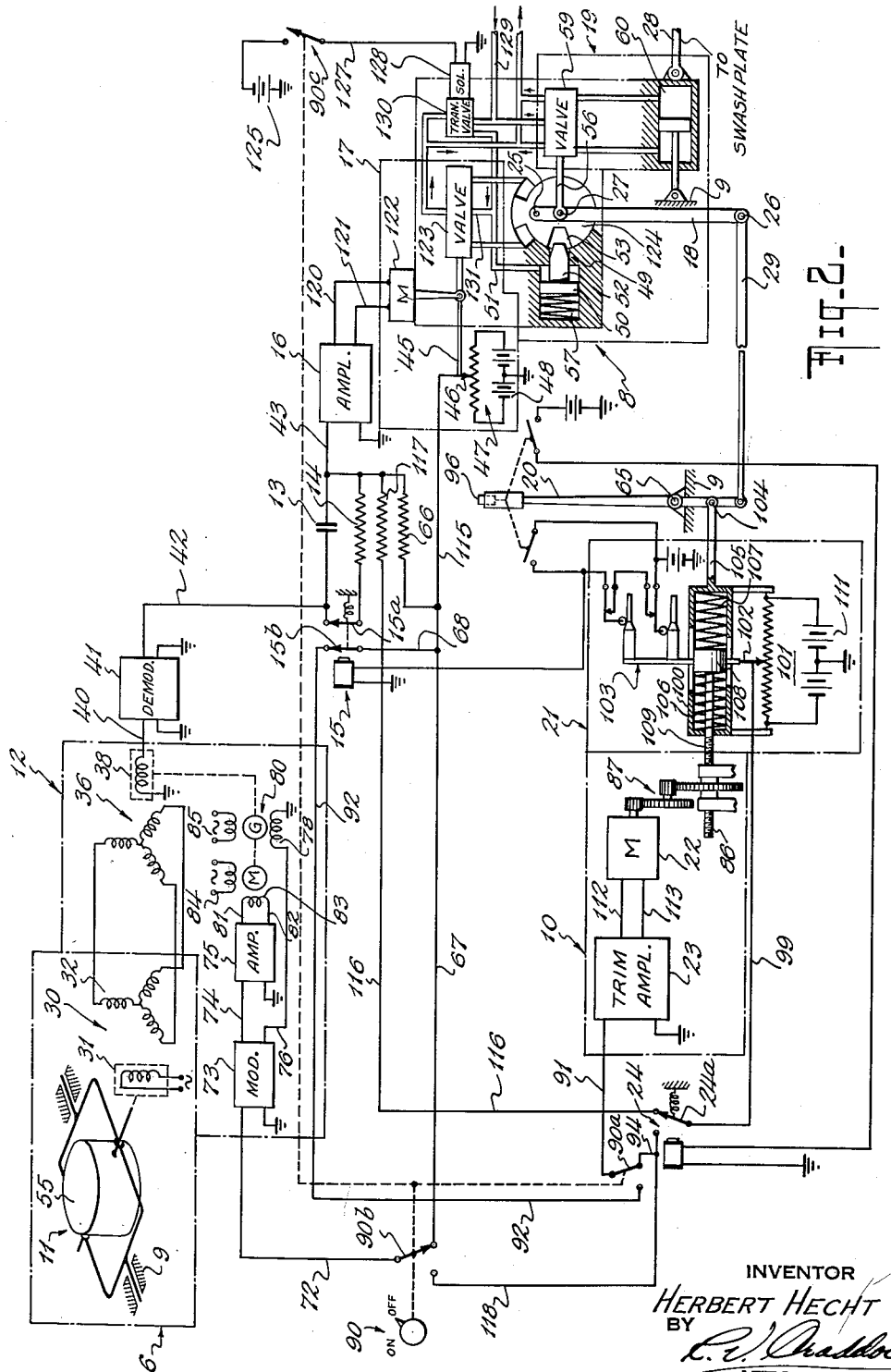

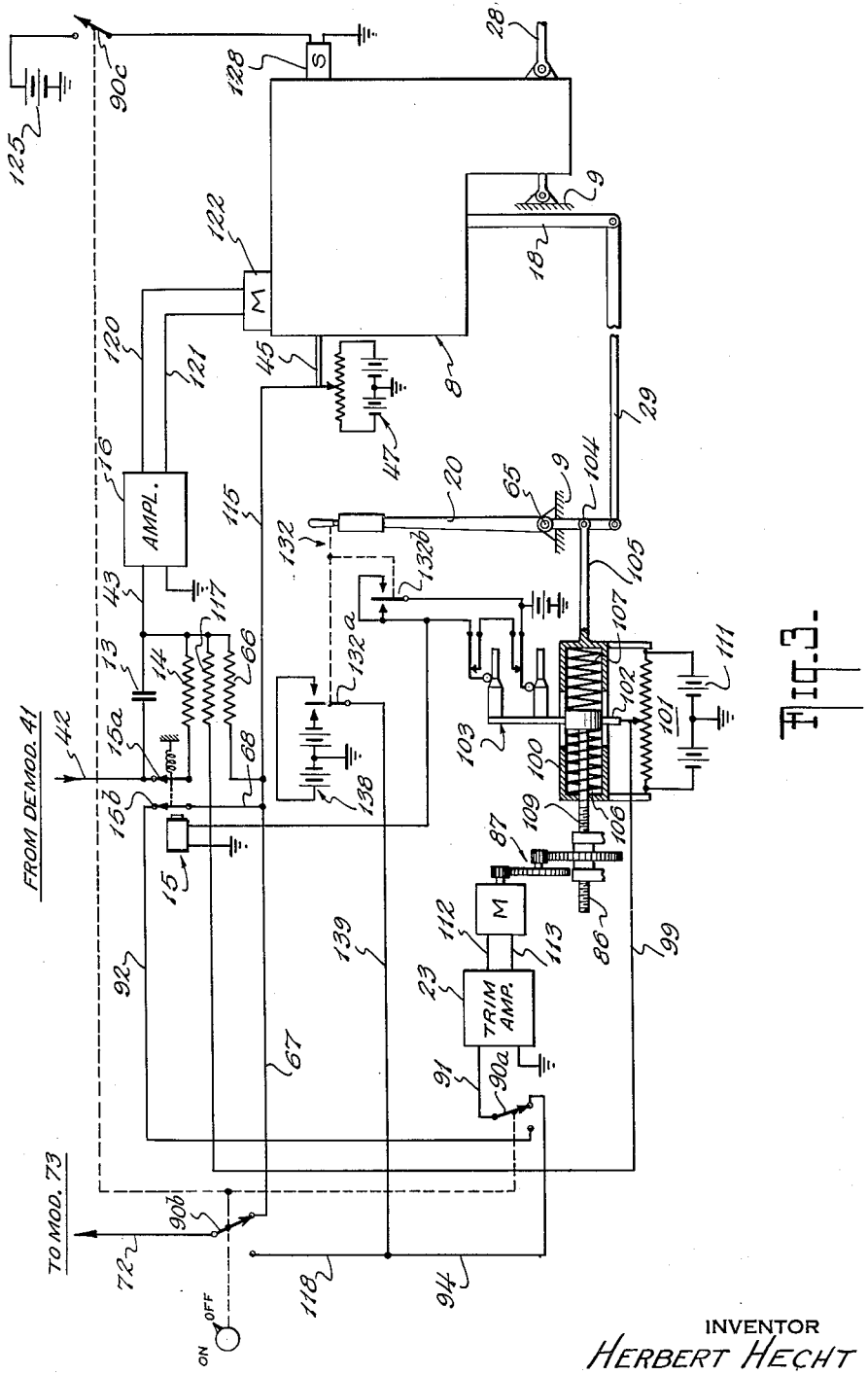

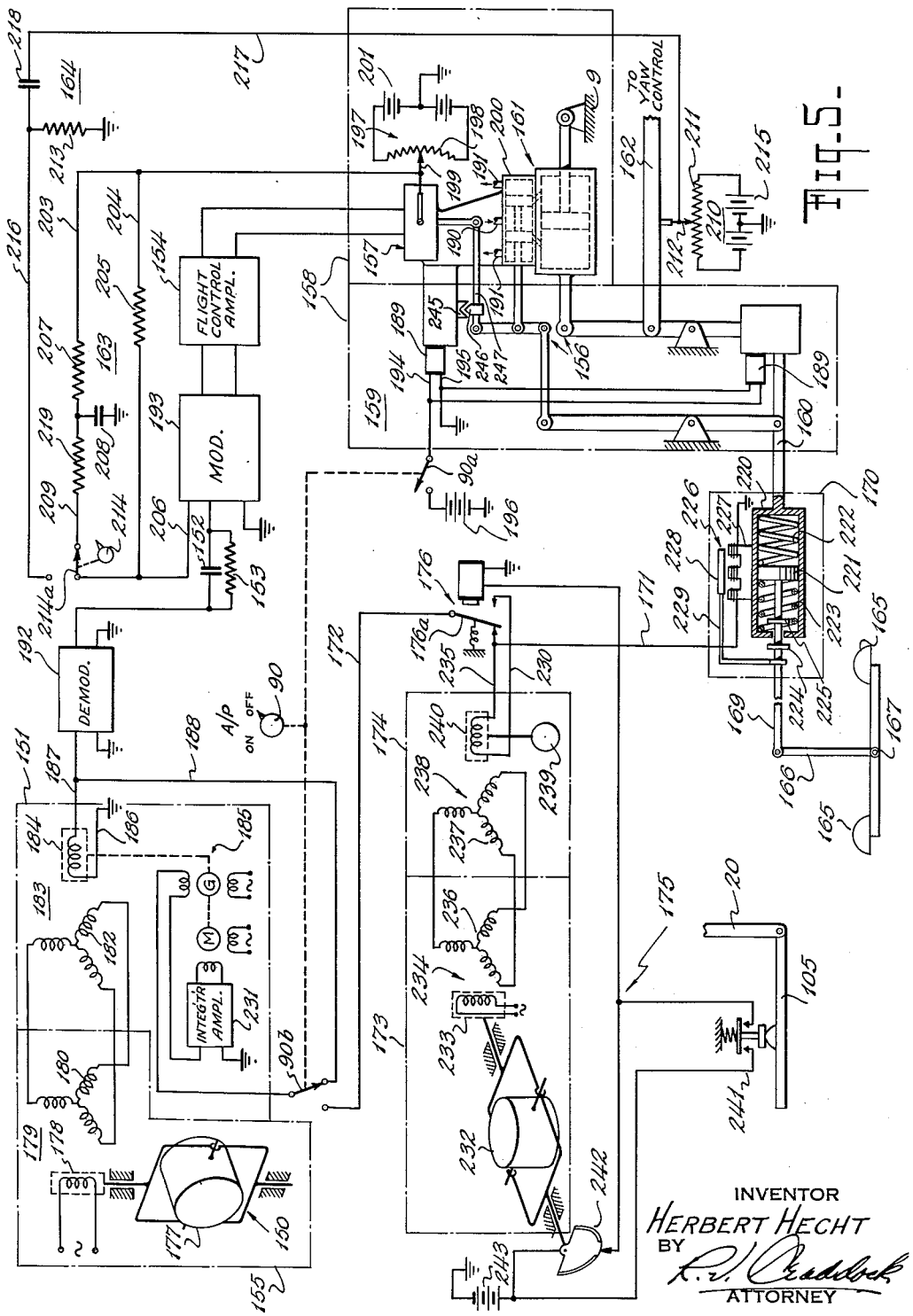

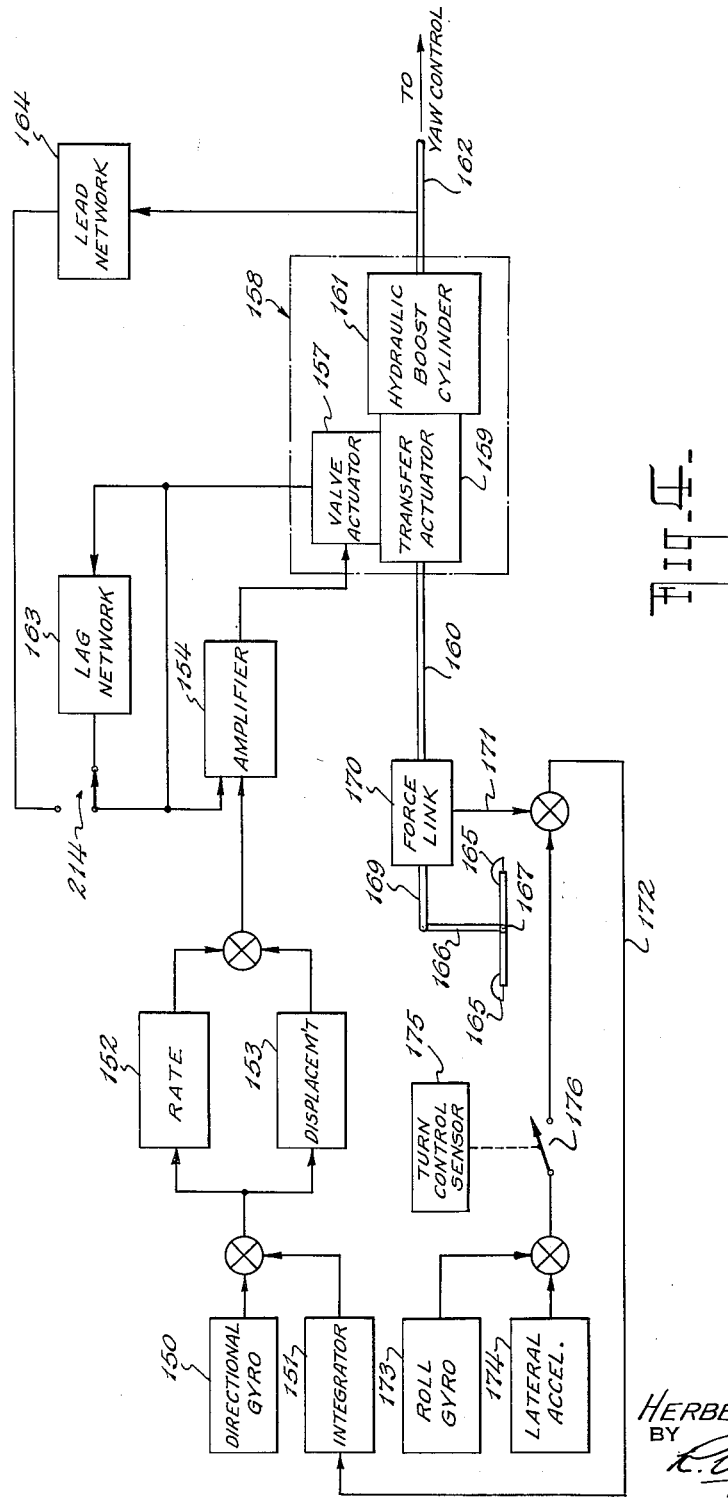

United States Patent Office 3,021,097
Patented Feb. 13, 1962

3,021,097
AUTOMATIC PILOT FOR DIRIGIBLE CRAFT
Herbert Hecht, Wantagh, N.Y., assignor to Sperry Rand Corporation, a corporation of Delaware
Filed June 28, 1956, Ser. No. 594,492
29 Claims. (Cl. 244—77)

This invention relates to an automatic pilot for dirigible craft and more particularly to an automatic pilot for stabilizing an aircraft about its primary axes and in altitude and for automatically controlling the maneuvering of said aircraft.

The automatic pilot in the present invention is particularly applicable to rotary wing aircraft which are capable of operation under an extremely wide range of flight conditions.

Flight control systems have been devised to partially or completely take over the pilot's function of the control of fixed wing and rotary wing aircraft. In the prior art, the pilot was usually required to initiate commands through one mode of control when operating manually and through a different mode of control when operating in the automatic flight control mode. In the manual mode, the manual stabilization and maneuvering of aircraft, particularly of the rotary wing type, usually requires the pilot to position several manually operable control elements. In the case of conventional rotary wing aircraft there are three separate control elements, i.e. cyclic stick, collective stick and yaw pedals utilized in manual flight. In aircraft of marginal stability, particularly rotary wing aircraft, the manually operable controls require constant manipulation to maintain a predetermined attitude. Heretofore the time required for the pilot to change from a manual mode to an automatic mode of control has been sufficient to generate engage transients within the system to cause violent maneuvering of the craft, under certain conditions, when the automatic mode is switched on. The present invention eliminates the above difficulties.

In conventional automatic flight control systems, the pilot usually engages the automatic mode through a separate automatic pilot command element. The normal manual controls are then rendered ineffective to change aircraft attitude and they are usually not responsive to the changes in aircraft attitude or flight condition. In the event the pilot wishes to convert from one mode of control to another, the attitude of the aircraft may be changed so drastically as to prevent safe recovery. In a preferred embodiment of the present invention, the pilot inserts both manual and automatic attitude commands through the manually operable members. The manually operable members are made responsive to the aircraft flight condition such that the pilot is at all times aware of aircraft attitude and may insert commands to compensate, change or override the automatic system.

In prior flight control systems, in the event short-term maneuvering was desired, the pilot was required to command an attitude change to reach the new attitude and then was forced to insert a compensating command to return to his original attitude. In an embodiment of the present invention, the pilot may maneuver the aircraft to change attitude, such as to clear an obstacle, and without further action on his part, by merely releasing his force on the manual control member, the aircraft will return to its original flight condition.

Prior automatic flight control systems which permit pilot's control of the automatic flight control equipment through the manually operable aircraft controls have limited the authority of the automatic equipment to a fraction of the travel of the manual equipment. Accordingly, the maneuvering capabilities of the automatic equipment were severely restricted. This limitation is overcome by the present invention.

In fixed wing aircraft, the deflection of the control stick produces a rate of change of attitude proportional to the pilot's stick force due to the moment created by deflection of the control surface which is mounted at a distance from the aircraft's center of gravity. This condition is generally desirable but in rotary wing aircraft, up to this point, it has not been achieved due to the location of the control surface, i.e. rotary wing, at the helicopter's center of gravity. Pilot's motion on the control stick in rotary wing aircraft therefore produces an acceleration proportional to the force applied rather than a rate as in fixed wing aircraft. The present invention overcomes this limitation by moving the secondary actuator to aid or oppose the motion of the control stick. The secondary actuator will come to rest only when the attitude reference rate is equal and opposite to the control stick or bungee signal and as such the helicopter is controlled to a rate of attitude change proportional to the pilot's stick force.

In the collective pitch axis of rotary wing aircraft, the lift of the rotor blades is dependent upon air speed and as such if the air speed of the craft is changed, deviations of the collective actuator from its previous position may be required. In the prior art, the new actuator position would cause deviations from the previously maintained altitude which were undesirable. In the present invention, the use of a floating actuator position feedback signal overcomes this difficulty.

Trim systems for fixed wing and rotary wing aircraft in the prior art suffer from several limitations. One of the more serious limitations concerns a difference in the feel characteristics of the stick under manual and automatci flight conditions. Another limitation concerns re-trimming the stick during the automatic mode of control only, and the absence of control stick trim during manual flight. With the present invention, in manual flight and in automatic flight the stick may be trimmed and re-centered automatically at the discretion of the pilot. In manual flight, the stick is recentered by feeding a bungee signal to the trim servo to trim out the forces on the stick, while in automatic flight the stick is trimmed by use of a feedback signal from the secondary actuator. The stick may then follow long term surface motions while short term stabilization or high frequency motions may be not be reflected at the stick.

It is, therefore, a primary object of the present invention to provide an automatic pilot having an improved stabilization system which permits more precise control of craft attitude than it has been possible heretofore and overcomes the limitations of other control systems enumerated above.

It is a further object of the present invention to provide an improved stabilization system for maintaining fixed wing and rotary wing aircraft at the desired roll, pitch and yaw attitudes and at the desired altitude.

It is a further object of the present invention to provide an improved stabilization system in which the roll, pitch, yaw and altitude can be changed at the pilot's discretion through operation of the normal aircraft flight controls i.e. manually operable members.

Another object of the present invention is to provide an improved control system in accordance with the foregoing in which stabilization motion of the automatic equipment is not reflected at the pilot's manually operable control.

It is still a further object of the present invention to provide a system in accordance with the foregoing in which the pilot's manually operable control members are kept in alignment with the aircraft control elements, i.e. elevator, swash-plate, etc., for all long term flight conditions.

It is a further object of the present invention to provide improved components of the automatic pilot system to permit more precise maintenance of fixed wing or rotary wing craft at a predetermined flight condition or to effect precision flight maneuvers.

These and other objects of the invention will become apparent from the description of the operation of the invention.

An understanding of the invention will appear more fully from the following description of its operation in a preferred embodiment when read in conjunction with drawings illustrating the embodiment in which, FIG. 1 is a block diagram of the invention applied to the roll or pitch control of an aircraft with the flight control system engaged;

FIG. 2 is a detailed schematic diagram of the invention applied to the roll or pitch control of an aircraft with means for selectively engaging or disengaging the flight control system;

FIG. 3 is a detailed schematic diagram of an alternate embodiment of FIG. 2;

FIG. 4 is a block diagram of the invention applied to the yaw control of an aircraft with the flight control system engaged;

FIG. 5 is a detailed schematic diagram of the invention applied to the yaw control system with means for selectively engaging or disengaging the flight control system.

Figure 1:
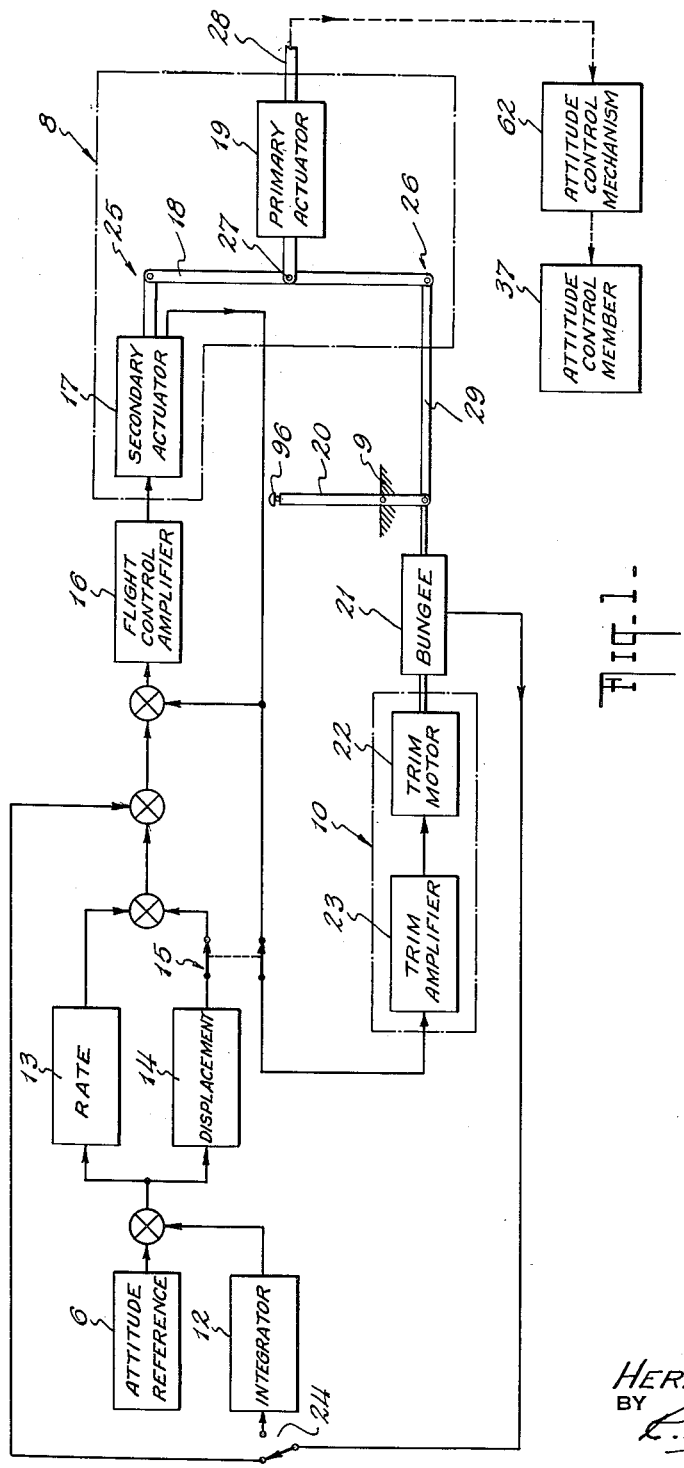

Reference is made to FIG. 1 which shows a simplified block diagram of a preferred embodiment of the invention. It is to be understood that the invention may be applied to control any axis of the craft. It is shown herein applied to the pitch or roll axis by way of example. As shown in the block diagram the system is in the automatic pilot mode with the flight control system engaged. The attitude or flight control reference 6 provides signals in accordance with deviations from a predetermined attitude or flight condition and could, for example be an attitude sensor, altitude sensor or radio navigation signal producing means.

The signal output of the attitude reference 6 is combined with that of integrator 12, the operation of which will be described more fully below. The combined signal is separated by suitable means into rate and displacement components through rate circuit 13 and displacement circuit 14 respectively. After the displacement signal has been brought through one section of switch 15, the rate and displacement signals are recombined and supplied to flight control amplifier 16. Also supplied to the input of flight control amplifier 16 are signals from resilient centering means such as bungee 21 which are fed through switch 24, and a servo feedback signal that is derived from secondary actuator 17, which will be described more fully later. The sum of the aforementioned signals constitues the input to amplifier 16 which controls the secondary actuator 17. The output of the secondary actuator 17 positions the upper pivot point or pin 25 of differential link 18. The lower pivot point or pin 26 of the differential link 18 is connected through link 29 to the pilot's control stick or manually operable member 20 which in this case is the cyclic stick. Also connected to the differential link 18 at a point 27 between pivot points 25 and 26 is the input linkage to the primary actuator 19. The output connection 28 of the primary actuator 19 controls the craft's attitude control mechanism 62 which in turn is connected to control the craft's attitude control member 37 and hence controls the attitude of the craft.

In conventional fixed wing aircraft, the attitude control mechanism might be the linkage between the actuator and the attitude control member or control surface, such as the elevator in the pitch axis. In a helicopter, the attitude control mechanism might be the linkage and the swash-plate actuated by the primary actuator to control the cyclic condition of the helicopter rotor blades or attitude control member and thereby control the helicopter's attitude in pitch or roll. In certain embodiments the secondary actuator 17, the differential link 18, and the primary actuator 19 may be combined in a single differential actuator means, generally indicated at 8, similar to the type described in application No. 580,957 filed April 26, 1956, now U.S. Patent No. 2,936,135 entitled Automatic Pilot and Manual Booster for Dirigible Craft, in the names of J. E. Zupanick et al. with the exception that in the present invention the actuator feedback signal is derived as a function of secondary actuator position instead of a function of the rotary actuator position which will be explained in detail later. A differential actuator is characterized by its ability to permit automatic stabilization signals to go to the attitude control member without being reflected at the pilot's control stick.

The pilot's control stick 20 is restrained with respect to the aircraft structure 9 by a mechanical linkage coming from trim motor 22 and connecting via the springs of bungee 21 to the control stick 20. The trim motor 22 and trim amplifier 23 form motive means for trim servo 10. The purpose of this arrangement is to provide a spring return of the control stick 20 to a position determined by trim servo 10 while at the same time deriving an electrical signal from bungee 21 which is proportional to the instantaneous deflection of control stick 20 from its centered position. The electrical signal derived from the bungee 21 is selectively fed through switch 24 to the input of amplifier 16 or to the input of integrator 12. Switch 24 is in the position shown for all modes of operation of the aircraft other than during the execution of long term attitude changes. During the execution of long term attitude changes, switch 24 is positioned to connect to the input of integrator 12.

Also provided is a connection for the feedback signal from secondary actuator 17 through switch 15 to the input of trim amplifier 23. The purpose of this connection is to position trim motor 22 and bungee 21 such that long term deflections of the secondary actuator are transmitted through trim amplifier 23, trim motor 22 and bungee 21 to control stick 20.

The operation of the system shown in FIG. 1 in the automatic pilot mode with the flight control system engaged will now be discussed for three conditions:

(1) Non-maneuvering flight,
(2) Short term maneuvering after which it is decided to recover the original attitude, and
(3) Long term maneuvers, with the intent of permanently changing aircraft attitude.

Switching conditions for the non-maneuvering flight in the automatic pilot mode are as shown in FIG. 1. Switch 15 is closed and switch 24 connects the bungee signal to the input of amplifier 16. Under these conditions, the feedback signal from the secondary actuator 17 will be zeroed since any standing feedback signal would cause continuous operation of trim servo 10. As a result of such a trim servo operation, the differential link 18 and through it point 27, which is the primary actuator input, would be positioned in a manner to cause attitude changes and will permit the secondary actuator 17 to return to zero and hence to eliminate the feedback signal. Also, unless the pilot is exerting deliberate forces against the control stick or column 20, bungee 21 is centered and hence the bungee signal to the amplifier 16 is zero. It has thus been demonstrated that both the feedback signal and the bungee signal are zero. Under steady state conditions, the sum of the rate and displacement signals must therefore also be zero since there would otherwise be an amplifier output which would drive the secondary actuator 17 and cause deviation from the prevailing state. With the secondary actuator and the helicopter attitude stable, the rate signal will vanish. The system therefore must satisfy the condition that the attitude reference output is equal and opposite to the integrator output, or, in other words, the aircraft is in the attitude established by the integrator 12.

Assuming that after the aircraft has been maintained under these conditions for a period of time, due to a sudden change in wind conditions or in aircraft center of gravity location, the aircraft may deviate from the previously established attitude. This would first result in an attitude rate signal and somewhat later in an attitude displacement signal. These will cause an output from amplifier 16 and hence motion of the secondary actuator 17 until the feedback signal cancels the attitude reference signals at the input of amplifier 16. These conditions result in a temporary equilibrium of the secondary actuator servo loop. The standing feedback signal, however, is also being fed to trim amplifier 23 causing motion of trim motor 22 which is transmitted through bungee 21 to stick 20. It is further transmitted through link 29 to the differential link 18 and hence to the primary actuator 19. If the initial reaction of the secondary actuator 17 was sufficient to recover the original aircraft attitude, the subsequent operation of the trim servo 10 will tend to over-correct. As soon as this happens, however, a new output from the attitude reference 6 will cause the secondary actuator 17 to retreat towards its centered position. This process continues until the full necessary swash-plate motion for the new wind condition has been transferred through the trim servo system to stick 20. At this point the secondary actuator 17 will again be zeroed. The operation of the trim system is made deliberately slow such that it does not respond to random gust disturbances.

The description of this mode of operation has explained one of the principal features of this system, namely that for all long term conditions the secondary actuator is zeroed and the control stick is positioned through the trim system exactly as it would be for manual flight in a given attitude and aircraft condition.

Switching conditions for short term maneuvering in the automatic pilot mode are: switch 15 opened whenever the pilot is applying force to the control stick 20, and switch 24 as shown in FIGURE 1, connecting the bungee signal to the input of amplifier 16.

Assuming that the aircraft has been previously stabilized to the prevailing attitude as discussed above and that the pilot wants to execute a short term pitch-up maneuver, for example to clear an obstacle, he will then pull back on stick 20 against a moderate spring force from bungee 21. In doing so he moves point 26 of the mixing bar and through it he causes the primary actuator 19 to move. As soon as force is applied to the bungee 21, switch 15 is opened by means shown in FIG. 2 and an electrical signal proportional to stick motion is generated in the bungee 21 and is fed through switching means 24 to the input of amplifier 16. At the same time the amplifier will receive a signal proportional to the rate of aircraft attitude change as sensed by attitude reference 6 and operated on by rate network 13. As long as the rate signal is exactly equal and opposite to the bungee signal there will be no output from amplifier 16 and hence no motion of secondary actuator 17. If the bungee signal calls for a higher rate of attitude change than that sensed by the attitude reference 6, the resulting amplifier output will cause secondary actuator 17 to move so as to produce an additional pitching moment until signal equilibrium is established. If the rate sensed by the attitude reference 6 is greater than that commanded by the bungee signal, the secondary actuator will similarly be moved so that the pitching moment will be reduced. Since switch 15 is opened when the bungee signal is sensing the pilot's force, the resulting secondary actuator motion will not cause operation of the trim servo system 10.

After clearing the obstacle, the pilot may want to regain his original attitude which he may do by releasing his force from stick 20. This will immediately return the manual input point 26 of differential link 18 to its original position, will cause switch 15 to close, and the bungee signal will go to zero. All conditions have now been reestablished to restore equilibrium of the system after the aircraft returns to its premaneuvering attitude.

In the above, three other important features of this pitch attitude system have been established, namely: (1) During short term maneuvering, the aircraft will be controlled to a rate of attitude change proportional to the pilot's stick force, (2) The secondary actuator motions necessary to establish this stabilization are not reflected at the pilot's stick, and (3) The short term maneuvering leaves the trim system and the integrator unchanged so that immediately upon the pilot's concluding his maneuver, the original attitude can be regained.

Switching conditions for long term maneuvers in the automatic pilot mode are as follows: Switch 15 is in the closed position as shown in FIG. 1 and switch 24 connects the bungee signal to the input of integrator 12. This position of switch 24 may be established, for example, by the pilot depressing a trim button 96 located on top of the cyclic control stick. When button 96 is depressed, switch 15 remains closed regardless of bungee force and switch 15 will remain closed as long as the pilot's trim button 96 is depressed.

The pilot then initiates his long term maneuver by moving the cyclic control stick 20 in the conventional manner against the force of bungee 21. As soon as this happens, point 26 on differential link 18 is displaced, thus providing an input to the primary actuator 19 which will move the attitude control mechanism 62 and cause the craft to pitch towards a new attitude. At the same time, an electrical signal is generated within bungee 21 due to the pilot's force and this signal is fed through switch 24 to integrator 12. The integrator 12 provides an output proportional to the integral of the input signal; that is to say, if the pilot's force on the bungee 21 is maintained constant over a period of time, the output of the integrator 12 will increase or decrease at a constant rate during that period of time. The output of the integrator 12 is combined with the attitude reference signal. Since the craft has been pitching due to the direct pilot's input to the primary actuator 19, the attitude reference signal will also change. If the attitude reference signal changes at the same rate as the integrator output, the resulting signal fed to rate and displacement networks 13 and 14 respectively will be zero and no other inputs will be fed to amplifier 16. Hence no motion of the secondary actuator 17 will result. If the pitching rate of the craft as sensed by the attitude reference 6 is less than that corresponding to the rate of output change of the integrator 12, the resulting signal after passing through rate network 13 and displacement network 14 will cause amplifier 16 to provide an output to move secondary actuator 17 in a manner so as to bring the rate of craft pitching motion into agreement with that provided at the output of integrator 12. In the process of doing this, a feedback signal is generated which is fed through closed switch 15 to the input of trim amplifier 23 causing motion of trim motor 22 to move bungee 21 in a direction aiding the pilot's initial motion on the stick and thus causing, for a given pilot's force, a greater pitching moment of the aircraft. Similarly, if the rate of craft motion exceeds that corresponding to the integrator output, the secondary actuator 17 will at first move to retard this rate of pitching of the aircraft and the resulting signal will also be fed to the trim amplifier 23 causing the trim motor 22 to move bungee 21 in the direction opposite to the pilot's effort, so that for a given pilot's force, a smaller input will be fed to the primary actuator 19.

After attaining the desired attitude, the pilot releases his force from the control stick 20 which removes the input to the primary actuator 19 through link 29 and point 26 of differential link 18. This causes the bungee signal to disappear, thus stopping integrator 12. At this point, the aircraft is controlled such that the steady state output of attitude reference 6 is equal to the output of integrator 12 which means that the existing condition of the aircraft will be maintained. Operation from this point on will follow that described under 1 above for the non-maneuvering flight.

The description of the long term maneuver has established two other important features of this control system, namely: (1) During the maneuvering part, the rate of craft attitude change will be proportional to the pilot's force, and (2) Upon completion of the maneuver in this mode, the craft will be retained in the new attitude.

With the aid of FIG. 2, the control system will now be explained in detail as applied to the control of a helicopter around the pitch or roll axes. Whereas FIG. 1 shows the system with the flight control system engaged in the automatic pilot mode, FIG. 2 shows the modes of operation when the automatic pilot mode is engaged and also when it is not engaged. The attitude reference 6 in a preferred embodiment includes a vertical gyroscope 11 and in certain embodiments may also include integrator 12.

Vertical gyro 11 consists of gyro rotor housing 55 which is mechanically coupled to rotor 31 of self-synchronous pick-off 30. Changes in aircraft attitude in roll or pitch are sensed by gyro housing 55 and result in varying the position between the rotor element 31 and stator element 32 of self-synchronous pick-off 30. Rotor winding 31 is energized from a suitable source of alternating current. The terminals of stator winding 32 are connected to corresponding terminals of a similar self-synchronous pick-off 36 which is part of the integrator 12. One of the terminals of rotor winding 38 of self-synchronous pick-off 36 is connected to ground. The other rotor terminal is connected through lead 40 to the input of demodulator 41.

The output of demodulator 41 referred to ground, is carried by lead 42 to a network comprising the rate circuit 13, a capacitor, and the displacement circuit 14, a resistor. Relay contact or arm 15a of switch 15 is inserted in series with resistor 14 for the purpose of disabling, under certain conditions, the displacement part of the signal. The junction of capacitor 13 and resistor 14 is connected through lead 43 to the input of amplifier 16. Also added to the input of the amplifier 16, is the bungee signal carried by lead 116 through resistor 117 and the feedback signal being carried through lead 115 to resistor 66. The output of amplifier 16 is connected through leads 120 and 121 to the servomotor or torque motor 122 of the secondary actuator 17 of actuator 8 previously mentioned. Also, provided as part of the actuator 8, is the transfer solenoid 128 and transfer solenoid valve 130. Transfer solenoid 128 is energized through lead 127 and arm 90c of switching means 90 from battery 125. When energized, the transfer solenoid 128 causes transfer solenoid valve 130 to assume a position in which hydraulic pressure fluid is admitted through line 129 from a suitable source of hydraulic pressure fluid not shown. The pressure fluid may then be ported through line 131 to the secondary valve 123 and through line 51 to the variable coupling and stop device 49. Torque motor 122 positions the secondary valve 123. When hydraulic fluid is admitted as heretofore described through line 131, secondary valve 123 controls the position of secondary output member or rotary actuator 124. The design of rotary actuator 124 is such that the output motion is proportional to valve motion. Force available at the output is, of course, much greater. Rotary actuator 124 is joined to differential link 18 by means of pin 25.

The variable coupling and stop device 49 cooperates with the rotary actuator 124 in a manner fully described in the aforesaid application No. 580,957 now U.S. Patent No. 2,936,135. Briefly, plunger 52 of device 49 cooperates with the limit providing slot 53 of rotary actuator 124 to limit the angular motion of rotary actuator 124 in relation to plunger 52 and accordingly to limit the input to the differential link 18 from the secondary actuator 17. The degree of authority is adjusted by changing the spacing between the tapered end of plunger 52 and the adjacent radial walls of the slot 53. Movement of the plunger 52 to a position in which the same engages the slot 53 centralizes the rotary actuator 124 and zeroes any input to the differential link 18 through point 25. The plunger 52 is solidly connected to piston 50 which is acted on by the force of spring 57 and by the force of the hydraulic pressure fluid in the cylinder of device 49. The relationship between these elements is such that the plunger 52 will engage the slot 53 unless hydraulic pressure fluid is passed through the transfer valve 130 and line 51 to the cylinder of device 49.

The relative movement of point or pin 25 and point or pin 26 on the differential link 18 will determine the movement of point or pin 27. Pin 26 through linkage 29 connects with the pilot's stick 20 which swivels with respect to the aircraft structure 9 about pin 65. The motion of pin 27 through rod 56 controls the motion of primary valve 59. Primary valve 59 receives hydraulic pressure fluid through line 58 and controls the fluid in power motor or power cylinder 60 of primary actuator 19. The output of power cylinder 60 is connected through linkage 28 to the helicopter swash-plate. The cyclic movement of the rotor blades controlled by the swash-plate determines the attitude of the helicopter in pitch and roll.

Attached to secondary valve 123 is link 45 which carries the arm 46 of potentiometer 47. The mechanical arrangement provides for motion of the arm 46 relative to the potentiometer 47 proportional to the motion of secondary valve 123. Potentiometer 47 is also connected to a center-tapped battery 48. When the secondary valve 123 is centered, arm 46 is at ground potential. Lead 115 connects arm 46 to resistor 66. The signal provided through lead 115 is also carried through lead 68 to arm 15b of switch means 15. In the unenergized position of switch 15, arm 15b connects with lead 92. When the flight control system is engaged and switching means 90 is in the "on" position, arm 90a of switching means 90 connects lead 92 and lead 91 to the input of trim amplifier 23.

When the flight control system is not engaged and switching means 90 is in the "off" position, arm 90b of switching means 90 is connected to potentiometer arm 46 via leads 115 and 67. In this condition, the arm 90b of switching means 90 is connected through lead 72 to the input of modulator 73 which is part of the integrator 12. The output of modulator 73 is connected through lead 74 to the input of integrator amplifier 75. The other connection of the output of modulator 73 is carried through lead 76 to the generator output winding 78 of motor generator 80. The other terminal of generator output winding 78 is grounded. The purpose of the last-mentioned electrical connections is to add in series the signals generated in winding 78 and in modulator 73 prior to their becoming the input of amplifier 75. The output of amplifier 75 is carried through leads 81 and 82 to the motor control field 83 of motor generator 80. The fixed field 84 and the generator excitation winding 85 of motor generator 80 are connected to a suitable source of alternating current. The shaft of motor generator 80 is mechanically connected to the rotor 38 of pick-off 36.

When the flight control system is engaged and switching means 90 is in the "on" position, arm 90b of switching means 90 connects the modulator 73 through lead 72 to lead 118. When the pilot's trim button 96 mounted on top of the pilot's control stick 20 is depressed, switching means 24 operates such that arm 24a connects with lead 118. The input of modulator 73 is then derived from the electrical output of bungee 21 which is carried by lead 99 to arm 24a of switch 24 and through lead 118 to arm 90b of switching means 90 and through lead 72 to modulator 73. When trim button 96 is not depressed, the bungee signal carried by lead 99 is connected through arm 24a of switching means 24 via lead 116 to resistor 117 at the input of amplifier 16. When the flight control system is not engaged and the trim button 96 is depressed, the bungee signal carried by lead 99 is connected through arm 24a of switch 24 to lead 118 and through arm 90a of switching means 90 to lead 91 and thence to the trim amplifier 23.

The output shell 100 of bungee 21 is attached through rod 105 to pin 104 of pilot's stick 20. Within the bungee shell 100 rides piston 108 which is attached through rod 109 to lead screw 86 and gearing 87 that is coupled to the output of trim motor 22. Also located within bungee shell 100 are centering springs 106 and 107, one on each side of piston 108. The effect of this arrangement is that control stick 20 is spring restrained to a position dictated by piston 108 but can be moved against the force of either spring 106 and 107 away from this position. The travel permitted by bungee springs 106 and 107 is twice the normal pilot's control stick excursion required to move the swash-plate hard over to hard over. The travel of trim motor 22, on the other hand, is limited to an amount not to exceed normal swash-plate excursion. Thus, the pilot can, by overcoming bungee spring forces, command any swash-plate position regardless of the instantaneous position of the trim motor.

Also attached to bungee 21 is a potentiometer 101 that is connected to battery 111 which applies equal positive and negative voltages with respect to ground to the potentiometer terminals. The physical arrangement is such that the body of the potentiometer 101 is attached to the shell 100 of bungee 21, whereas the arm 102 of the potentiometer rides with the piston 108. The voltage picked off by arm 102 is then proportional to the state of compression of the bungee springs 106 and 107 and its polarity is indicative of the direction of the compressing force. Also attached to bungee 21 is a detent switch 103 which assumes one position when the springs are compressed, no distinction being made here as to the direction of the compressing force. The detent switch 103 has actuating rollers that are fixed relative to shell 100. Through conventional circuit means switch 103 causes switch 15 to open when either one of the bungee springs 106 or 107 is compressed unless switch 103 is disabled by depressing trim button 96. Arms 15a and 15b of switch 15 are closed when switch 15 is energized as shown in FIG. 2.

The trim motor 22 may be of the linear actuator type in which a reversible D.C. motor drives an output rod through a gear and lead screw arrangement. The actuator is powered from trim amplifier 23 via leads 112 and 113. The trim amplifier 23 may be either a proportional amplifier, for instance, of the vacuum tube or magnetic type, or a non-linear amplifier of the contactor type. The latter is particularly well suited for the efficient operation of reversible permanent magnet D.C. motors.

The operation of the flight control system of FIG. 2 will now be described for the following 5 flight conditions:

(1) The flight control system is not engaged, normal flight maneuvers, (2) Flight control system not engaged, re-trim, (3) Flight control system engaged, non-maneuvering flight, (4) Flight control system engaged, short-term maneuvering, (5) Flight control system engaged, long-term maneuvering.

It will be recognized that modes 3, 4 and 5 here correspond respectively to 1, 2 and 3 of those enumerated with respect to the discussion of FIG. 1.

When the automatic pilot is not engaged and normal flight maneuvers are conducted, switching means 90 will be in the "off" position as shown, switch 15 will be in the closed position as shown, and switch 24 will be deenergized as shown. Under these conditions, there will be no hydraulic pressure applied to the cylinder of component 49 and plunger 52 will therefore be pushed against the slot 53 of rotary actuator 124 by spring 57, thus fixing pin 25 on differential link 18. Since the upper end of link 18 is fixed, the only remaining input is the pilot's manual input through stick 20, bar 29, pin 26, link 18, pin 27, and primary actuator linkage. By operating the stick 20, the pilot has thus full and sole control over the swashplate. The pilot will feel the centering force of the bungee springs 106 and 107 whenever he tries to move the stick away from the neutral position.

As the helicopter maneuvers in this manner, its attitude will change from time to time which will cause the rotor 31 of synchronous pick-off 30 within gyro 11 to assume a different position relative to the stationary windings 32 thereof. The electrical signal generated will cause a change in the output of rotor 38 of the pick-off 36 of integrator assembly 12. This signal is fed along lead 40 to the input of demodulator 41 and through rate circuit 13 and displacement circuit 14 which causes an input to appear at lead 43 of the amplifier 16. The resulting amplifier signal is fed through leads 120 and 121 to the torque motor 122 of secondary actuator 17. Movement of torque motor 122 causes a displacement of valve 123 which is sensed by potentiometer 47. The electrical signal at arm 46 is fed through lead 115 back to the amplifier input through resistor 66. This causes temporary rebalancing of the amplifier. At the same time, however, the feedback signal is also carried through lead 67 and through arm 90b to lead 72 and from there to the input of modulator 73. Through the further action of amplifier 75 and motor generator set 80, rotor 38 of synchronous pick-off device 36 is repositioned so as to reduce the original amplifier input derived from demodulator 41. The purpose of this arrangement is to cause, for all steadystate flight conditions, a rebalancing of the gyro attitude signal by the integrator 12 and thus to assure that no sizeable transients will occur when the automatic flight system is engaged at any time during flight. The secondary purpose of this arrangement is to assure that secondary valve 123 will be nulled for all manual flight conditions. This is accomplished since any signal sensed by the potentiometer 47 will cause immediate corrective action through the integrator 12 which will cause amplifier 16 to send out a signal which will retract the secondary valve 123 to its centered position. The trim servo 10 is completely inoperative in this flight mode since arm 90a connects to lead 94 which is not connected to any signal source in this flight mode. Thus, the trim servo will remain stationary.

When the flight control system is not engaged and the pilot desires to retrim, the switching conditions are: switching means 90 deenergized as shown, switch 15 in the closed position as shown, switch 24 operated in a manner such that arm 24a connects to lead 118.

Plunger 52 of component 49 will, as in the previous flight mode, capture pin 25 of differential link 18, thus assuring that the only input to the primary actuator 19 is the pilot's motion. To retrim, the pilot depresses the trim button 96 on top of stick 20 which causes switching means 24 to take on the operated position previously described. He also applies a force to the stick in the direction of the desired re-trim. This causes spring 106 or 107 to be compressed and generates a signal at the arm 102 of the potentiometer 101. This signal is fed through lead 99 and arm 24a of switching means 24 to lead 94 and hence to arm 90a of switching means 90 to lead 91 and to the input of the trim amplifier 23. The trim amplifier 23 will then send a corresponding amplified signal along leads 112 and 113 to trim motor 22 which will cause the trim motor to rotate so as to bring piston 108 and arm 102 respectively into alignment with the bungee body 100 and with the potentiometer body.

With the flight control system engaged, in non-maneuvering flight, the switching conditions are: switching means 15 closed as shown, switching means 90 energized in the "on" position, switching means 24 deenergized as shown. While the aircraft is under manual control, the pilot may at any time engage the flight control system by positioning switching means 90 from the "off" to the "on" position. This will establish the other required switching conditions described just above. While in manual flight, through the ganged arms 90a, 90b and 90c of switch 90, the integrator 12 has followed up on the prevailing attitude as sensed by gyro 11. In the automatic flight mode, the aircraft will thus be maintained in exactly the attitude which existed just prior to engagement of the automatic flight control system.

Any small deviations from this attitude will be sensed by rotor element 55 of gyro 11 and will change the alignment between rotor 31 and stator 32 of self-synchronous pick-off 30. This will result in an electrical output at lead 40 connecting with rotor 38 of self-synchronous pick-off 36 in integrator 12. The signal there generated is fed to demodulator 41 and becomes available as an equivalent D.C. voltage at lead 42 connecting with rate capacitor 13 and displacement resistor 14. Through lead 43 the combined rate and displacement signals are fed to the input of amplifier 16. The output of the amplifier 16 acting through torque motor 122 operates valve 123 and thus causes an equivalent arcuate displacement of rotary actuator 124. Rotary actuator 124 operating through pin 25 and link 18 causes the same motion to be transferred to input linkage 56 of primary valve 59. Through the action of the primary actuator 19, the motion is transmitted to connection 28 to the swash-plate which is moved to restore the aircraft to the previous attitude.

As soon as valve 123 has moved from its center position, an electrical signal, generated on potentiometer arm 46, is carried through lead 115 and resistor 66 to the input 43 of amplifier 16. The polarity of this feedback signal is such as to oppose the original attitude disturbance signal and thus to reduce the amplifier output. In the absence of any such feedback signal, even a small attitude disturbance might cause a large amount of valve travel, which in turn would over-correct for the given attitude disturbance.

As the aircraft returns to its original attitude, the output of demodulator 41 vanishes and the standing voltage on lead 115 is the only remaining input to amplifier 16. The output of amplifier 16 will then cause torque motor 122 to recenter valve 123 until the signal on lead 115 also goes to zero.

If, however, the disturbance is of a persistent nature, for instance, shift of the center of gravity of the craft, a new swash-plate position may be required permanently to retain the helicopter in its original attitude. Under these conditions, the signal developed on lead 115 will persist for a long period of time. This signal is then fed through lead 68 to arm 15b and to trim amplifier 23 which causes operation of trim motor 22. The trim servo 10 acting through bungee 21 causes the pilot's stick 20 to move in the direction aiding the output of secondary actuator 17 as applied to link 18. The swash-plate will be displaced so as to slightly over-correct for the attitude disturbance. As this is sensed by the gyro 11, the output of demodulator 41 will diminish and this will cause a reduction in the amount of secondary valve displacement. This process continues until the new swash-plate position is established entirely on the basis of the position of stick 20. Secondary valve 123 and rotary actuator 124 are then returned to the centered position and the voltage on lead 115 disappears, thus causing stoppage of trim servo 10.

With the aircraft under automatic control as described above, the pilot may wish to execute a short-term maneuver, e.g., to pitch up so as to clear an obstacle. He may do this by pulling back on stick 20 which causes immediate operation of the primary actuator 19 and corresponding change in the position of the swash-plate. In moving the stick 20, the pilot has compressed spring 106 or 107 of bungee 21 and has generated an electrical signal on arm 102 of potentiometer 101. He has also operated detent switching means 103 and thereby has caused switch 15 to become deenergized disconnecting arms 15a and 15b. The electrical signal generated by the potentiometer 101 is fed through lead 99, arm 24a, lead 116, and resistor 117 to the input lead 43 of amplifier 16. The amplifier 16 also will receive, through rate capacitor 13, an input proportional to the rate of attitude change of the aircraft. Amplifier 16 produces an output proportional to any difference between the bungee signal and the rate of attitude signal. Through the secondary actuator 17, the control system acts on primary actuator 19 and the swashplate to modify the rate of aircraft attitude change until the rate signal is equal and opposite to the bungee signal, as sensed at the input of amplifier 16. Since arm 15b is also open, the resulting secondary actuator motion is prevented from causing any changes in position of trim servo 10. Thus, the entire control action is established without motion or force changes appearing at pilot's stick 20.

To execute a long-term attitude change with the flight control system engaged, the pilot depresses trim button 96 on stick 20 and simultaneously moves the stick in the direction of the desired attitude change. When button 96 is displaced, switching means 24 is operated and switching means 103 is disabled. Switching means 15, which is controlled through switching means 103, is thus kept in the closed position as shown, regardless of bungee force. The electrical signal derived from potentiometer 101 is fed through lead 99, arm 24a, lead 118, arm 90b of switching means 90 and lead 72 to modulator 73. An output is thus produced from amplifier 75 which will cause motor-generator 80 to turn such that the generator output signal appearing on lead 76 is equal and opposite to the output of modulator 73. Rotor 38 of self-synchronous pick-off 36 is also rotated at a rate proportional to the generator output. Thus, a rate of attitude change is commanded which is proportional to the pilot's force on the bungee. If the aircraft does not maneuver at this same rate of attitude change, the resulting error signal will be fed through demodulator 41 and lead 42 to the rate and displacement circuits 13 and 14, respectively. The resulting output of amplifier 16 will cause operation of secondary actuator 17 so as to bring the rate of attitude change in to agreement with that corresponding to the pilot's force. Any secondary actuator motion required for this maneuver will be sensed by potentiometer 47 and the resulting signal will be fed through leads 115 and 68, arm 15b, lead 92, arm 90a to the input lead 91 of trim amplifier 23. The output of trim amplifier 23 will cause operation of trim motor 22. If the rate of aircraft attitude change is faster than that commanded by the integrator 12, the trim servo 10 will operate so as to increase the pilot's force at a given stick position. To maintain a given force level, the pilot will therefore tend to recenter the stick 20, reducing the manual input to primary actuator 19 and thereby reducing the rate of attitude change.

If the original rate of attitude change is lower than that commanded by the integrator 12, the resulting feedback signal will cause operation of the trim servo 10, so as to reduce the pilot stick force at a given stick position. If the pilot maintains the same force, he will therefore move the stick further away from its centered position, thus causing a greater rate of aircraft attitude change.

An alternative pitch or roll control system is shown in FIG. 3. Many elements will be recognized which are identical with those of FIG. 2 and which are designated by like numerals. The major difference is the substitution of the beeper switch 132 for the pilot's trim button 96 in FIG. 2. The beeper switch 132 may be a four-way momentary contact switch which may be moved to the left, right, forward, or aft, by the pilot. Only the electrical circuitry associated with one axis, e.g., fore and aft motion, is shown in FIG. 3. Movement of the switch 132 in the forward direction, for example, causes arm 132a to connect the positive terminal of battery 138 to lead 139. Similarly, aft motion of the beeper switch 132 causes arm 132a to connect the negative terminal of battery 138 to lead 139. Lead 139 connects through lead 94 and arm 90a to the input of trim amplifier 23. Lead 139 also connects through lead 118 to the normally open contact of arm 90b and through lead 72 to the input of modulator 73. Through the operation of arm 132b, the detent switch 103 will be made inoperative whenever the beeper switch 132 is deflected from its neutral position.

The operation of the beeper switch system shown in FIG. 3 is identical in operation to that of the trim button system described above with the following exceptions: For trimming in the manual flight mode, the pilot moves the beeper switch 132 in the direction of the desired trim, e.g., for bringing the nose of the helicopter down, he moves the beeper switch forward causing the positive terminal of battery 138 to be connected through arm 132a, leads 139 and 94, arm 90a to the input 91 of trim amplifier 23. This causes motion of the trim motor 22 which through the bungee 21 will move the stick forward and impart a corresponding motion to the swash plate. In the embodiment shown, the trim motor 22 will always operate at the same speed, since only a constant potential is available at the input of the trim amplifier 23. One advantage to this arrangement is that the pilot becomes accustomed to the given trim speed and easily learns the time interval that he has to move the button in order to achieve a certain amount of trim. However, the application of a potential that varies in magnitude in accordance with a desired flight condition is also within the scope of the invention. Another way in which the trim system may be used in manual flight is that the pilot moves the control stick against the force of the bungee springs till he attains the desired attitude, and thereafter moves the beeper switch until he feels zero force in the column. At this point, the ship is trimmed for the desired attitude.

The other flight mode which is affected by the change to the beeper switch is the long term maneuvering in automatic flight. In this condition, arms 90a and 90b will be operated such that the voltage appearing on lead 139 will be fed via lead 118 and arm 90b to the input 72 of modulator 73 and cause operation of the motor-generator 80. To achieve a comparatively small change in long term flight attitude, the pilot may just move the beeper switch 132 in the desired direction, thereby causing operation of integrator 12 which in turn changes the gyro reference at a fixed rate. As the aircraft approaches the desired attitude, the pilot releases the beeper switch 132, causing stoppage of the integrator 12. Through the operation of the attitude control system previously described, the aircraft will be stabilized in the attitude corresponding to the new integrator position. The feedback signal generated in this process will cause operation of the trim system in the manner previously described, and after a short period of time, the stick 20 will automatically be brought to the position required for maintaining the new attitude. Alternatively, the pilot may move the stick 20 first, until the helicopter is in the desired attitude, and thereafter operate the beeper switch 132 until he feels the forces of the stick relieved, at which point the aircraft is trimmed out for the new attitude.

The turn control system and yaw axis components of the flight control system are shown in FIG. 4. The same system is also applicable to control of altitude by substituting an altitude sensor for the gyroscope, collective stick for rudder pedals, and by eliminating the turn control components. Aircraft heading is sensed by a directional gyroscope 150 which may be of the magnetically slaved type described in Patent No. 2,357,319 entitled Flux Valve Magnetic Compass issued to Esval et al. dated September 5, 1944 and assigned to the same assignee as the present invention.

Rate and displacement signals are derived from the output of gyroscope 150 after it has been combined with the output of integrator 151 by rate circuit 152 and displacement circuit 153, respectively. The rate and displacement signals are recombined and fed to the input of amplifier 154. Other inputs to the amplifier 154 are feedback signals from the valve actuator 157 or the output connection 162 of the parallel actuator means 158. A parallel actuator is characterized by its ability to reflect all attitude conditions or signals back to the control stick. The parallel actuator means 158 may comprise valve actuator 157, transfer actuator 159, power motor or hydraulic boost cylinder 161 and other components similar to that shown in Patent No. 2,678,177 entitled Manual Booster and Automatic Pilot Servo System issued to Chenery et al., dated May 11, 1954 and assigned to the same assignee as the present invention with the exception that the valve actuator or servo-motor of the present invention provides a feedback signal as a function of its position which will be fully described later.

The output of amplifier 154 drives valve actuator 157. The valve actuator 157 in turn connects to the transfer actuator 159 which also receives a mechanical input through connecting link 160. The operation of the transfer actuator 159 is fully described in the previously mentioned patent to Chenery et al. Briefly, the transfer actuator 159 connects the mechanical input through link 160 to the control valve 200 of the hydraulic boost cylinder and provides limited freedom of movement between link 160 and output connection 162 whenever the automatic pilot is not engaged. When the automatic pilot is engaged, the transfer actuator 159 connects the output of valve actuator 157 to the input of hydraulic boost cylinder 161 and connects the mechanical input linkage 160 to the hydraulic boost cylinder output connection 162. The motion imparted by the valve actuator 157 to the input element of hydraulic boost cylinder 161 is sensed by a suitable position sensing mechanism to be more fully described later, and provides the valve position feedback signal from the valve actuator 157 to the amplifier 154. The same signal is also applied to integrating or lag network 1633 and emerges therefrom as the floating actuator position signal which may also be applied to amplifier 154 depending upon the condition of switch 214. An alternative means of obtaining the floating actuator position signal is to sense the position of hydraulic boost cylinder output connection 162 by suitable electrical position sensing means and to feed the corresponding signal into differentiating or lead network 164. The valve position feedback signal is required for the purpose of stabilizing the valve actuator loop. The floating actuator position signal is required for the purpose of stabilizing the overall attitude control loop. The floating actuator position signal contains the same information as the normal actuator position signal for all frequencies above approximately $\frac{1}{10}$ of a cycle per second. It does, however, suppress the steady state actuator position; that is to say, the floating actuator position signal can go to zero for any steady state position of the actuator. To cope with changes in power settings or lateral trim, the yaw actuator may from time to time have to assume new positions to maintain a given heading. If a normal feedback signal were used instead of the floating actuator position signal, this would result in a steady state input to amplifier 154 which thus would require another steady state input to cancel it. This could come only from the displacement signal through displacement circuit 153 and this in turn would mean that the directional gyro 150 would be indicating a different heading. In other words, to compensate for power changes or changes in lateral trim, the aircraft would be required to deviate from the previously flown heading. These difficulties are overcome through the use of an actuator position signal which suppresses the steady state term. The signal is called here floating actuator position signal since it represents deviations from a floating neutral point. This signal can be derived either by feeding the position of output connection 162 through lead network 164, or by feeding the position of valve actuator 157 through lag network 163.

The mechanical input through link 160 of actuator means 158 is derived from the pedals 165 through rotating linkage 166 which swivels with respect to aircraft structure about point 167 and through translating linkages 169 and 160 between which force link 170 is interposed. It is the purpose of the resilient centering means or force link 170 to generate an electrical signal proportional to pilot's pedal force when the aircraft is in the automatic flight condition. The construction of the force link will be more fully described below in the discussion of FIG. 5. It suffices here to say that an electrical signal is derived which is indicative of the direction and magnitude of the pilot's pedal forces and is fed through lead 171 and lead 172 to the input of integrator 151. When coordinated turns are desired, a signal from a roll gyro 173 which may be the vertical gyro of FIG. 2, and a signal derived from lateral accelerometer 174 are added to the force link signal. Both of these signals are summed and are fed through switching means 176 which is operated by turn control sensor 175 to be described later. The turn control sensor 175 closes switching means 176 when either of the following conditions prevail:

(1) The pilot exerts more than a given threshold force on the lateral cyclic stick, indicating that he wants to execute a lateral maneuver, or (2) The bank angle of the aircraft exceeds some threshold value of say between 3 and 5 degrees.

Under either one of these conditions, the aircraft is engaged in lateral maneuvering and it is assumed that coordinated turns are desired. For this purpose, the directional gyro reference is being changed by suitable inputs to integrator 151. In forward flight of any aircraft, the rate of heading change is proportional to the bank angle. For this reason, the roll gyro signal is used to command an integrator input and therefore a rate of heading change proportional to roll angle. It is known that the proportionality between bank angle and rate of heading change is affected by air speed. Thus, if the roll gyro were the sole input to the integrator, good coordination could be achieved at only one air speed. Should mis-coordination occur in the system described here, a signal will be developed by the lateral accelerometer 174 which will then add a correcting input which is added to that of the roll gyro 173. During hovering or in backward flight, the operation of the turn control sensor 175 may be undesirable, and through conventional electrical switching means not shown, the turn sensor 175 may be disabled under these conditions.

The operation of this system will now be described for each of the following modes:

(1) Flight control system disengaged, (2) Flight control system engaged—non-maneuvering flight, (3) Flight control system engaged, skid turn maneuvers, (4) Flight control system engaged, coordinated turn maneuvers.

When the automatic pilot is disengaged, the transfer actuator 159 connects the manual input connection 160 directly to the input of hydraulic boost cylinder 161, and valve actuator 157 is idling. The pilot thus has direct control of the aircraft yaw axis through his pedal 165. The compression or extension of force link 170 will be negligible, since the operating force required by the hydraulic boost cylinder 161 is very light. The only work being done by the pedals is in moving a hydraulic valve.

When the automatic pilot is engaged in non-maneuvering flight, transfer actuator 159 connects valve actuator 157 to the input of hydraulic boost cylinder 161. The manual input linkage 160 is then connected to the output connection 162 of the hydraulic boost cylinder 161. For flight on a constant heading, it is required that the output of the directional gyro 150 be cancelled by equal and opposite output from integrator 151. Once the flight control system is engaged, integrator 151 is stopped, as will be discussed below, and any deviations of the aircraft from the prevailing heading will then result in a net output from directional gyro 150 which is not cancelled by the integrator 151. This output will be acted on by rate network 152 and displacement network 153 and will be fed to amplifier 154. The amplifier causes motion of valve actuator 157 and a position feedback signal is generated. This signal will short-term-wise cancel the rate and displacement signal. As a result of the valve displacement, hydraulic boost cylinder 161 will be exposed to a fluid pressure differential which will cause motion of its output member 162 and corresponding control of the aircraft in yaw. As this happens, the floating actuator position signal is generated which causes further cancellation of the original directional gyro error signal. This signal change, acting through the amplifier will tend to re-center the valve actuator 157, and the aircraft may be presumed to be back to its original heading. If the latter object is not achieved, the remaining error signal from the directional gyro will cause repetition of the above-mentioned process. In the process of moving the control surfaces, the actuator 158 also will have re-positioned the rudder pedals 165, since these have been tied through the action of the transfer actuator 159 to the output member 162 of the yaw control system. Thus, the pilot is at all instances aware of the corrective action taken through the control system.

With the flight control system engaged and operating, in accordance with the description above, the pilot may execute skid or flat turns, by applying forces to pedals 165. As long as the automatic pilot is engaged, transfer actuator 159 will connect mechanical linkage 160 to the yaw control output member 162. Thus, a great restraining force is applied to the output end of force link 170. As the input linkage 169 of the force link 170 moves under the influence of pilot's pedal forces and the output linkage 160 does not, the differential displacement causes an electrical signal to be generated along lead 171. This is fed to the integrator 151 causing the integrator to change its output at a rate proportional to the pilot's pedal force. This will result in an input to amplifier 154 since at least initially, the directional gyro 150 will not indicate any corresponding change in aircraft attitude. The output of amplifier 154 will cause a motion of valve actuator 157, and initial cancellation of the input by a corresponding valve position feedback signal. As a result of this valve displacement, the output member 162 of the hydraulic boost cylinder 161 will move, causing simultaneously a yawing of the aircraft in the desired direction and also a motion of the pedals in the direction of the pilot's applied force. Thus, the pilot is immediately aware of the maneuvering resulting from his input. As the aircraft yaws, the signal generated by the directional gyro 150 will tend to cancel the integrator output. When the two cancel exactly, there will be no resulting signal to amplifier 154 so that the valve actuator 157 will be returned to center. As soon as the pilot relieves his force on the pedals 165, the output from force link 170 will cease and integrator 151 will be stopped. The aircraft will then be stabilized at this heading in such manner that the output of directional gyro 150 is equal and opposite to the output of integrator 151. It is thus seen that for yawing maneuvers, the aircraft can be controlled at a rate of turn proportional to the pilot's pedal force. As soon as the pedal force is returned to zero, the rate of turn is reduced to zero and the aircraft will then maintain the new heading.

Coordinated turn maneuvers are initiated when the automatic pilot is engaged by the pilot applying a force in the desired direction to the lateral cyclic stick. As soon as this happens, a switching means associated with the lateral cyclic stick to be described below will cause turn control sensor 175 to operate, connecting roll gyro 173 and lateral accelerometer 174 to the input of integrator 151. As a result of the pilot's operation of the lateral cyclic stick the aircraft will roll, the angular displacement being sensed by roll gyro 173. The output of integrator 151 then changes at a rate proportional to the aircraft roll angle. In the manner identical to that previously described for the skid turn control, the yaw system will now cause the aircraft to yaw until the directional gyro output cancels the integrator output. If the aircraft is not in a coordinated turn, the resulting centrifugal or centripetal force will be sensed by the lateral accelerometer 175. This correcting input to integrator 151 will increase or reduce the rate of turn command until a coordinated turn is obtained. If the pilot wishes to aid or oppose the turn coordination system, he can do so at any time by applying corrective forces to the rudder pedal 165. After the aircraft has attained a given bank angle, the pilot does not further need to apply a force to the cyclic stick. For this reason, and to prevent discontinuance of the turn control system under these conditions, the turn control sensor 175 is operated also by a signal proportional to the roll attitude. Thus, after the aircraft roll angle exceeds a certain value, for example, 4 degrees, pilot's stick force is no longer required to keep turn control sensor 175 operated.

The detailed construction of the yaw control system will now be described with the aid of FIG. 5. The attitude reference means 155 may comprise directional gyro 150 consisting of gyro case 177 operatively connected with rotor 178 of self-synchronous pick-off device 179, which also includes stator windings 180. Rotor winding 178 is excited from a suitable source of alternating current. The equivalent terminals of the stator winding 180 connect with those of stator 182 of the self-synchronous pick-off device 183 which forms part of the integrator 151. The rotor winding 184 of the self-synchronous pick-off device 183 is mechanically connected to motor generator set 185. The electrical output of rotor 184 is obtained by leads 186 and 187 of which lead 186 is grounded while lead 187 connects to the input of demodulator 192, by means of which the A.C. output obtained from rotor 184 may be converted into an equivalent polarity reversing D.C. signal. The electrical output of the rotor 184 is further fed through lead 188 to arm 90b of switching means 90.

The output of demodulator 192 feeds the rate capacitor 152 and the displacement resistor 153. The combined signal at the output of this network then forms one input of modulator 193. Modulator 193 provides a phase reversing A.C. output proportional to the magnitude of two D.C. inputs, either one or both of which may be polarity reversing. The other input to modulator 193 is derived from the valve position and floating actuator position signals which will be described further below. The output of modulator 193 is fed to amplifier 154 and after amplification is used to drive valve actuator 157 which may be a torque motor or servo motor similar to motor 122 of FIG. 2, for example.

In the automatic pilot mode, valve actuator 157 connects through transfer actuator 159 by suitable linkages 156 to the hydraulic boost valve 200 which controls the movement of the hydraulic boost cylinder 161, all of the latter components being part of the actuator means 158 that may be similar to the aforesaid Chenery et al. patent. Hydraulic boost valve 200 is supplied with fluid at a constant high pressure from a suitable fluid pump source not shown by way of intake line 190. Hydraulic boost valve 200 is of such character that the hydraulic boost cylinder 161 operates at a velocity that is substantially proportional to the displacement of the valve 200 from its neutral position by controlling the passage of the fluid to and exhaust of the fluid from the hydraulic boost cylinder 161. The exhaust lines 191 for the valve 200 return the fluid from the hydraulic boost cylinder 161 to a suitable sump not shown. The movement of the hydraulic boost cylinder 161 is transmitted to the output connection 162 through transfer actuator 159 and suitable linkages 156.

The actual transfer within the transfer actuator 159 is controlled by solenoids 189 through leads 194 and 195. Lead 195 is connected to ground while lead 194 is connected through arm 90a of switching means 90 to the positive terminal of battery 196, the negative terminal of which is grounded. Mechanically connected to valve actuator 157 is potentiometer 197 consisting of resistance winding 198 and arm 199. The terminals of resistance winding 198 are connected to the outside terminals of battery 201, the center tap of which is connected to ground.

The alignment between the potentiometer 197 and valve actuator 157 is such that when the valve actuator 157 positions the hydraulic boost valve 200 to neutral, the wiper 199 rests at the electrical center of winding 198, such that it is at ground potential. As the valve actuator 157 opens the valve 200 in one or the other direction, an electrical signal will then be generated on arm 199 which is positive or negative with respect to ground by an amount proportional to the valve opening. This signal is fed through lead 204 to gain-adjusting resistor 205 and from there to the input lead 206 of modulator 193. The signal generated on arm 199 of the potentiometer is also carried through lead 203 to the lag network 163 consisting of resistor 207 and capacitor 208. The output of the lag network 163 is the floating actuator position signal and is carried through resistor 219 and lead 209 to the input lead 206 of modulator 193.

At the output connection 162 of the hydraulic boost cylinder 161 there may be provided a second potentiometer 210, the resistance winding 211 of which is attached to the frame of the aircraft while the arm 212 is mechanically connected to the movable output connection 162 of the boost cylinder 161. Terminals of the resistance winding 211 of the potentiometer 210 are connected to the positive and negative terminals of a battery 215, the center tap of which is connected to ground. In this manner the electrical signal generated at arm 212 corresponds in magnitude and direction to the motion of output connection 162. This electrical signal is also equivalent to the motion of the hydraulic boost cylinder as well as the motion of the attitude control mechanism. This signal is fed through lead 217 to lead network 164 consisting of capacitor 218 and resistor 213. The output of lead network 164 is further carried through lead 216. It may be substituted for the signal obtained on connection 209 by selectively positioning arm 214a of switch 214 and may be fed to the input lead 206 of modulator 193. The equivalence of the signals derived through leads 209 and 216 is demonstrated in Table I under the assumption of negligible loading working into an infinite impedance.

Table I

| | Path Through Network 163 | Path Through Network 164 |
|---|---|---|
| Input | Valve displacement $=$ | Output connection displacement $d = \frac{x}{s}$ |
| Network Transfer Function | $\dfrac{\frac{1}{sC}}{R+\frac{1}{sC}}$ | $\dfrac{R}{R+\frac{1}{sC}}$ |
| Output | $\dfrac{LC}{sCR+1}$ | $\dfrac{LCR}{sR+\frac{1}{C}} = RC\dfrac{LC}{sCR+1}$ |

$C=$ Capacitor value in farads.
$L=$ Inductance value in henrys.
$R=$ Resistance value in ohms.
$s=$ Differential operator.

It is seen that the outputs available are identical except for the numerical multiplication factor R.C. which can be made equal to unity by using a 1 microfarad capacitor and 1 megohm resistor.

When floating actuator signals are mentioned in the following, it is understood that they may be derived by either means. The mechanical input to the transfer actuator is derived from the pilot's pedal 165 acting through linkages 166 and 169. Linkage 169 is connected to the piston 221 of force link 179. The piston 221 can slide within shell 220, but the piston is resiliently restrained to the center of the shell by springs 222 and 223. In a preferred embodiment, the force gradient of the springs is selected such that maximum pilot effort causes displacement of the piston with respect to the shell by approximately .050 inch. Stops 224 and 225 are provided to limit the displacement of the piston with respect to the shell. Attached to shell 220 is the body 227 of E-pick-off 226. The armature 228 of the E-pick-off is attached through linkage 229 to the piston 221 of the force link 170. Thus, any displacement between piston 221 and shell 220 of the force link 170 will also result in a displacement of the E-pick-off armature 228 with respect to the body 227 of the E-pick-off. This displacement is sensed by the output windings of the E-pick-off which produce an electrical signal of phase and magnitude proportional to the direction and magnitude of the relative displacement of the force link parts. The excitation winding of this E-pick-off is applied in a known manner to the center leg and is not shown on this drawing. The signal derived from the E-pick-off is fed through connection 171 to lead 235 to arm 176a of switching means 176.

Switching means 176 is de-energized whenever the turn control system is not operating. In the de-energized position of switching means 176, the force link signal is fed from lead 171 to lead 235 via arm 176a through lead 172 to arm 90b of switching means 90. Switching means 90, when the automatic pilot is operative, connects the force link signal in series with the generator output to the input of integrator amplifier 231. When the turn control system is operative, arm 176a of switching means 176 connects with lead 230. The roll gyro 173 consists of gyro rotor case 232 which is mechanically connected to rotor winding 233 of self-synchronous pick-off 234. Rotor winding 233 is excited from a suitable source of alternating current. Self-synchronous pick-off device 234 also includes stator windings 236 which are connected with like stator windings 237 of self-synchronous pick-off 238. The rotor 240 of pick-off 238 is attached to the bob weight 239 of pendulum or lateral accelerometer 174. The rotor 240 of pick-off 238 has two terminals, one of which is connected to lead 235 while the other one is connected to lead 230. In this arrangement, an electrical signal proportional to the sum of roll angle and lateral acceleration is developed across the rotor windings 240. This signal is added in series with the force link signal whenever switching means 176 is energized such that arm 176a connects with lead 230.

Switching means 176 is energized by the operation of turn sensor 175 in order to achieve a coordinated turn when the pilot exerts more than a given threshold force on the lateral cyclic stick 20 or when the bank angle of the aircraft exceeds some threshold value. When the movement of lateral cyclic stick 20 exceeds the threshold value, normally open switch 241 of turn sensor 175, which may be mounted on rod 105 of stick 20 or may be included in detent switch 103 of FIG. 2, is closed thereby energizing switch 176 by connecting it to battery 243. As the bank angle of the craft exceeds a threshold value, commutator switch 242 of turn sensor 175 which is connected to the roll gyro 232 will be closed forming a second circuit through battery 243 to energize switch 176. While the aircraft exceeds the threshold value of bank angle, switch 242 will remain closed to energize switch 176 regardless of the force applied to stick 20.

The structure and function of the A.C. integrator assembly 151 is similar to that of the D.C. integrator assembly 12 of FIG. 2 and will not be discussed in detail here. One difference is that modulator 73 which is part of integrator assembly 12 is not contained in integrator assembly 151. The reason for this omission is that the signals applied to integrator assembly 151 are already alternating current and thus do not need to be modulated.

The detailed operation of the yaw control system will now be discussed with the aid of FIG. 5. It will be described for four different conditions, namely:

(1) Flight control system disengaged,
(2) Flight control system engaged, non-maneuvering flight,
(3) Flight control system engaged, flat turn maneuver,
(4) Flight control system engaged, coordinated turn maneuver.

Switching conditions for the non-automatic flight mode with the flight control system disengaged are: switching means 90 de-energized in the "off" position as shown such that transfer actuator 159 connects mechanical input linkage 160 directly to hydraulic boost valve 200, switching means 176 is de-energized and switch 214 is inoperative. With solenoids 189 de-energized, the tapered surface of centering element 245 engages the wedge-shaped lug 246 to center the linkage 247. Further, limited freedom of movement is provided between link 160 and output connection 162 with solenoids 189 de-energized. Under these conditions, the pilot's pedals 165 connect through force link 170 and the mechanical input linkage 160 to the hydraulic boost valve 200, which in turn controls the aircraft yaw control means through hydraulic boost cylinder 161 and output connection 162. The pilot's forces necessary for operating the hydraulic boost valve 200 are very small, since only a valve is being moved. Thus, the compression in the force link 170 is negligible and the force link may be considered as the rigid coupling between linkages 169 and 160. On the other hand, if the aircraft hydraulic system should fail, appreciable forces may have to be transmitted through the force link 170 since the friction and inertial forces of the yaw control linkages then will have to be overcome by the pilot. Even in this case, however, the force link compression 170 is limited to a fraction of an inch by stops 224 and 225.

While the pilot is controlling the aircraft in the manner described just above, any yawing of the aircraft will be detected by the directional gyro 150 and will result in displacement of pick-off rotor 178 with respect to the stator 180. The resulting electrical signal is fed to self-synchronous pick-off 183 and results in an error signal being developed across the rotor terminals thereof 186 and 187. The signal is fed through lead 188 and arm 90b of switching means 90 to the integrator amplifier 231. The amplifier output acting on motor-generator 185 will drive rotor 184 of the self-synchronous pick-off 183 to a new position so as to bring the error signal to a null or minimum. Thus, whenever, the control system is engaged, there will be no standing error at the output of the synchro rotor 184.

The valve actuator 157 is locked in the manual flight mode and any signals which may be impressed on modulator 193 and amplifier 154 thus do not become effective in the control system. The turn coordination is disconnected and signals being generated at the rotor 240 of synchronous pick-off 238 do not enter the control system at all.

The switching conditions for the flight control system engaged in the non-maneuvering flight mode are: switching means 90 energized in the "on" position, switching means 176 de-energized as shown and switch 214 may be in the position shown. Under these conditions, valve actuator 157 connects to the hydraulic boost cylinder 161, and the mechanical input linkage 160 through transfer actuator 159 is connected to the output connection 162 of the hydraulic boost cylinder 161.

Prior to engagement of the automatic pilot, the electrical signal generated by the gyro 150 has been cancelled by the operation of the integrator 151 in the manner described just above, so that the aircraft is stabilized to whatever compass heading had been maintained at the time of engagement. Under the influence of gusts or other disturbances, the aircraft may tend to yaw away from the previously established heading. Since 90b no longer connects lead 188 to the integrator 151, the gyro signal is now no longer cancelled by the integrator operation and the signal will appear at the input of demodulator 192 where it will be transformed into an equivalent D.C. signal. This is further fed through rate network 152 and displacement network 153 on to modulator 193 where it is re-converted into alternating current. The alternating current is amplified in amplifier 154 and operates valve actuator 157 causing a corresponding rate of position change of hydraulic boost cylinder 161 which appears at the output connection 162 thereof and acts through the yaw control system of the aircraft so as to oppose the yaw displacement. As soon as valve actuator 157 moves from its neutral position, an electrical signal proportional to the new position of the valve actuator is generated by potentiometer 197 and is fed through lead 204, resistor 205, and lead 206 to the second input of modulator 193. When it cancels the original gyro error signal, the amplifier output will go to zero and the valve actuator will stop. As the valve 200 is displaced from its neutral position, the hydraulic boost cylinder 161 will move at a rate proportional to this valve displacement, and output 162 will correspondingly move the yaw control elements of the aircraft. At the same time, however, the valve actuator signal appearing through lead 203, the resistor 207 and across capacitor 208 will charge this capacitor. This voltage will act through resistor 219 and lead 206 on modulator 193. The direction of this signal will also oppose the gyro signal and will cause motion of valve actuator 157, in the opposite direction. Output member 162 is then returned to its neutral position. At this point, presumably, the aircraft is restored to its original yaw attitude. While the boost cylinder operates, pedal 165 will always follow the output connection 162 and the pilot is at all times aware, therefore, of the action taking place in the yaw control system. If the disturbance was one which required not only a temporary change in the position of output connection 162 but a permanent change, the error signal developed through lead 203, resistor 207 and across capacitor 208 will tend to diminish in time, since the charge on capacitor 208 will leak off, for instance, through the resistor path provided by resistors 219 and 205. Therefore, the modulator input will diminish and the amplifier will be rebalanced. In the steady state amplifier 154 will have zero input as long as the gyro output at lead 187 is zero.

The foregoing discussion has demonstrated two important features of the yaw control system, namely (1) the yaw control system will operate whenever a yawing moment of the aircraft is detected from the attitude reference and the pedals will at all times follow the corrective motion of the actuator, and (2) a steady state displacement of the actuator will not require a steady state offset from the attitude reference to compensate for it.

When a skid turn maneuver is desired with the flight control system engaged, switching conditions are as above. With the aircraft being stabilized in yaw as described above, the pilot may initiate flat turn maneuvers by simply operating the pedals 165 in the manner very similar to that used in non-stabilized flight. Since the output linkage 160 attached to force link 170 is rigidly connected to hydraulic boost output connection 162, shell 220 of force link will not follow the pilot's motions transmitted from the pedals through linkage 166 to the piston linkage 169. The springs in the force link assembly, however, will compress to a small extent and the resulting motion will be sensed by the E-pick-off, an electrical signal being generated in lead 171. This signal will be fed through lead 171, lead 235, arm 176a, lead 172 to arm 90b. Arm 90b feeds this signal through the tachometer output windings to the input of amplifier 231. As long as the pilot maintains a steady force on the pedals, the signal generated by the E-pick-off will thus cause a constant rotation of motor generator 185 and a corresponding rotation of rotor 184 of self-synchronous pick-off 183. The resulting error signal from rotor 184 is fed through lead 187 to the input of demodulator 192 and has the same effect as a gyro error signal. Thus, the rate and displacement networks 152 and 153 operate on this signal and it is fed through modulator 193 to amplifier 154. It causes displacement of valve actuator 157, corresponding operation of the hydraulic boost cylinder 161, and motion of output linkage 162 thereof. The operation of the valve actuator is arrested when the error signal from potentiometer 197 fed through lead 204 and resistor 205 to the input lead 206 of modulator 193 cancels the original error signal applied to the modulator through networks 152 and 153. At this point, the hydraulic boost cylinder generates a steady rate of output motion which appears on output linkage 162 and carries pedals 165 with it. The pilot will thus sense that the flight control system is executing the maneuver which he directed and he can release his force if the aircraft is approaching the desired heading. Under the influence of the changed position of output linkage 162, the yaw control system of the aircraft will command the aircraft to a new heading which process will be sensed by pick-off 179 on gyro 150 and will cause cancellation of the error signal being generated in rotor winding 184. Thus, as the aircraft approaches the desired heading, the error signal initially on lead 187 reduces to zero which causes retraction of the valve actuator 157 to its neutral position. However, in the meantime, the integrated valve actuator signal across capacitor 208 has been building up, and as soon as the demodulator signal goes to zero the integrated valve position signal acting through the input lead 206 of modulator 193 will cause a reverse motion of valve actuator 157 which retracts output linkage 162 into its neutral position which is required for steady flight on the new heading.

While the flight control system engaged when a coordinated turn is desired, the switching conditions are: switching means 90 in the "on" condition, switching means 176 energized connecting arm 176a to lead 230 and switch 214 as shown. The operation of switching means 176 occurs only, however, after the pilot has applied some force to the lateral cyclic stick, removing it from its neutral position and initiating a banking maneuver of the aircraft as previously explained. As the aircraft is banking, a signal will be developed by the roll gyro 173 which will electrically be sensed at the output of rotor winding 240 of synchronous pick-off 238 in conjunction with the signal from pendulum 174. This signal will be fed through lead 172 to the input of integrator 151 and will cause a rotation of the self-synchronous pick-off 183 at a rate proportional to the instantaneous roll angle of the aircraft as sensed by roll gyro 173. The rotation of pick-off 183 will cause an error signal to be developed at rotor windings 184 which will be fed through lead 187 to demodulator 192 and will cause a yawing maneuver of the aircraft exactly in accordance with the previously described operation, since the integrator 151 does not distinguish between signal inputs coming from the pilot's force link or those coming from the turn control components. If the aircraft is in forward flight, the banking maneuver will, through aerodynamic coupling, also produce a turning the aircraft. If the aerodynamically caused rate of turn is exactly equal to that generated in integrator 151, there will be no net output from the integrator rotor and thus no motion of the lateral control system will take place. If, however, the rate of turn of the aircraft is not identical with that produced by the integrator, a corrective action will take place through the control system in the manner analogous to that previously described. If, during the maneuver, mis-coordination exists, this will result in a displacement of bob weight 239 of pendulum assembly 174 and will cause an additional corrective signal to be generated at the input of the integrator, which then will slow down or increase the rate of rotation of motor-generator 185 so as to reduce the lateral accelerations on the aircraft. At the conclusion of the coordinated turn maneuver, the pilot will recenter the lateral cyclic stick and after the aircraft has attained neutral bank attitude, the coordinated turn switch 176 will be de-energized removing the turning coordination signals from the integrator input and restoring and maintaining the aircraft at the previously attained heading. At any time during this maneuver the pilot may also insert heading changes through operation of the pedals as discussed above. While the invention has been described for purposes of simplicity and example as being applied in a certain manner, it is within the scope of the present invention to provide a control system for controlling an aircraft about one or more of the craft axes by providing signals in accordance with craft deviations from a predetermined roll, pitch, yaw and/or altitude condition to differential or parallel actuator means, or a combination of both, for operably controlling the aircraft control mechanism about one or more axes.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A control system for aircraft for controlling the attitude mechanism of the craft comprising reference means for providing signals in accordance with deviations from a predetermined attitude, actuator means for controlling said attitude control mechanism including first signal generating means providing a feedback signal, a manually operable member coupled to said actuator means, means resiliently coupled to said manually operable member including second signal generating means for providing a second signal in accordance with the magnitude and direction of the force applied to said manually operable member, actuator control means responsive to said attitude reference signals and to said feedback signal and operably coupled to said actuator means, motive means coupled to said resiliently coupled means, and switching means including first, second and third switching devices each having at least two conditions whereby with the first switching device in its first condition, said actuator means is rendered ineffective to transmit signals from said actuator control means to said attitude control mechanism, said feedback signal is also coupled to said attitude reference means, and said motive means is responsive to said second signal depending upon the condition of said third switching device; and with the first switching device in its second condition, said actuator means is rendered effective, said feedback signal is also coupled to said motive means depending upon the condition of said second switching device, and said second signal is coupled to said attitude reference means depending upon the condition of said third switching device.

2. A system as claimed in claim 1 including an integrating means selectively responsive to said feedback and said second and connected to vary the signals from said attitude reference means.

3. A system as claimed in claim 2 including means responsive to said attitude reference means for providing attitude rate and displacement signals to said actuator means whereby in one condition of said second switching device depending upon the condition of said third switching device, said feedback signal from said actuator means to said motive means is rendered ineffective, and said displacement signal from said attitude reference means to said actuator control means is rendered ineffective.

4. A system as claimed in claim 2 including manually operable trim means for actuating said third switching device whereby with the third switching device in its first condition said second signal is coupled to said actuator control means; and with the third switching device in its second condition said second switching device is rendered inoperative and said second signal is selectively coupled to said motive means and to said attitude reference means depending upon the condition of said first switching device.

5. A system as claimed in claim 2 in which the second switching device includes a detent switch positionably mounted for actuation upon movement of said resiliently coupled means.

6. A system as claimed in claim 2 in which the resiliently coupled means includes an artificial feel device comprising a cylinder connected to said manually operable member, a piston positionable within said cylinder by said motive means, and resilient means yieldingly adapted to center said piston within said cylinder whereby relative movement between said piston and said cylinder renders said second switching device operative except when rendered inoperative by said third switching device.

7. A control system for aircraft for controlling the attitude mechanism of the craft having a plurality of modes of operation comprising reference means for providing signals in accordance with deviations from a predetermined attitude, actuator means for controlling said attitude control mechanism including first signal generating means providing a feedback signal, a manually operable member coupled to said actuator means, actuator control means responsive to said attitude reference signals and to said feedback signal and operably coupled to said actuator means, means resiliently coupled to said manually operable member including second signal generating means for providing a second signal to said actuator control means in accordance with the magnitude and direction of the force applied to said manually operable member, motive means coupled to said resiliently coupled means, third signal generating means including means for providing a third signal in accordance with a desired attitude change of said craft, and switching means including first, second and third switching devices having at least first and second conditions for providing a plurality of modes of operation whereby with the first switching device in its first condition, said actuator means is rendered ineffective to transmit signals from said actuator control means to said attitude control mechanism, said feedback signal is also coupled to said attitude reference means and said motive means is responsive to said third signals depending upon the condition of said third switching device; and with the first switching device in its second condition, said actuator means is rendered effective, said feedback signal is also coupled to said motive means depending upon the condition of said second switching device, and said third signal is coupled to said attitude reference means depending upon the condition of said third switching device.

8. A system as claimed in claim 7 in which the third signal generating means includes means for providing a constant potential signal having a polarity in accordance with the direction of a desired attitude change.

9. A system as claimed in claim 7 in which the third signal generating means is positionably mounted on said manually operable member.

10. A system as claimed in claim 7 in which the attitude reference means includes means for providing rate and displacement signals and said switching means includes mean so constructed and arranged that in one condition of said second switching device depending upon the condition of said third switching device, said feedback signal from said actuator means to said motive means is rendered ineffective, and said displacement signal from said attitude reference means to said actuator control means is rendered ineffective.

11. A system as claimed in claim 10 including a manually operable keeper switch for actuating said third switching device whereby with the third switching device in its first condition it is ineffective; and with the third switching device in its second condition said second switching device is rendered inoperative and said third signal is selectably coupled to said motive means and to said attitude reference means depending upon the condition of said first switching device.

12. A system as claimed in claim 11 in which the second switching device includes a detent type switch positionably mounted for actuation upon movement of said resiliently coupled means.

13. A system as claimed in claim 12 in which the resiliently coupled means includes an artificial feel device comprising a cylinder connected to said manually operable member, a piston positionable within said cylinder by said motive means and resilient means yieldingly adapted to center said piston within said cylinder whereby said relative movement between said piston and cylinder renders said second switching device operative except when rendered inoperative by said third switching devices.

14. A system as claimed in claim 13 in which the attitude reference means includes an integrating means responsive to the signals supplied to said attitude reference means.

15. A manual boost and automatic control system for aircraft having manual boost and automatic modes of operation for controlling the attitude control mechanism of the craft comprising reference means for providing a signal in accordance with deviations of the craft from a predetermined attitude, actuator means including a primary actuator for controlling said attitude control mechanisms and a secondary actuator for controlling said primary actuator, a manually operable member coupled through said primary actuator for controlling said attitude control mechanism, means including a signal generating member resiliently coupled to said manually operable member for providing a signal in accordance with the magnitude and direction of the force applied to said manually operable member, actuator control means responsive to the signals from said attitude reference means and from said means including a signal generating member whereby the secondary actuator is positioned in accordance therewith, said secondary actuator including means for supplying a feedback signal to said actuator control means and to said attitude reference means, and means connected to said primary actuator for rendering said primary actuator unresponsive to said secondary actuator whereby the automatic control portion system of the craft is continuously nulled while in the manual boost mode to avoid transients when engaging the automatic control system.

16. A system as claimed in claim 15 in which the means including a signal generating member includes a bungee having a portion thereof resiliently coupled to the manually operable member whereby artificial feel is provided as a function of the displacement of the manually operable member.

17. A system as claimed in claim 15 in which the means for supplying a feedback signal to the attitude reference means includes an integrator means whereby steady state attitude reference deviations are balanced out to minimize engage transients.

18. A control system for aircraft for controlling the attitude control mechanism of the craft comprising reference means for providing a signal in accordance with deviations of the craft from a predetermined attitude, actuator means including a primary and secondary actuator, actuator control means responsive to said attitude reference signal and operably coupled to said secondary actuator, means including first signal generating means coupled to said secondary actuator for providing a feedback signal to said actuator control means and to said attitude reference means, a manually operable member coupled through said primary actuator for controlling said attitude control mechanism, means including a second signal generating means resiliently coupled to said manually operable member for providing a signal in accordance with the magnitude and direction of the force applied to said manually operable member, and motive means responsive to said last-mentioned signal and coupled to position said last-mentioned means whereby the manually operable member is centered in the steady state condition.

19. A system as claimed in claim 18 in which the means including a second signal generating means includes an artificial feel device, a portion of which is yieldingly coupled to the manually operable member whereby artificial feel is provided as a function of the displacement of the manually operable member.

20. A system as claimed in claim 18 in which the means including first signal generating means for providing a feedback signal to said attitude reference means includes an integrating means whereby steady state attitude reference deviations are balanced out to minimize engage transients.

21. A control system for aircraft for controlling the attitude control mechanism of the craft comprising reference means for providing a signal in accordance with deviations of the craft from a predetermined attitude, actuator means including a primary actuator for controlling said attitude control mechanism and a second actuator for controlling said primary actuator, a manually operable member coupled to said primary actuator, means resiliently coupled to said manually operable member including a signal generating means for providing a signal in accordance with the magnitude and direction of the force applied to said manually operable member, actuator control means responsive to the signals from said attitude reference means and from said resiliently coupled means whereby the secondary actuator is positioned in accordance therewith, motive means coupled to position said resiliently coupled means, said secondary actuator including means for supplying a feedback signal to said actuator control means and to said motive means, whereby the manually operable member is continuously centered in the steady state condition.

22. A system as claimed in claim 21 in which said resiliently coupled means includes a bungee, a portion of which is resiliently coupled to the manually operable member whereby artificial feel is provided as a function of displacement of the manually operable member.

23. A control system for aircraft for controlling the attitude control mechanism of the craft comprising means including attitude reference means for providing a control signal in accordance with the rate of craft deviation from a predetermined attitude, actuator means including a primary actuator for controlling said attitude control mechanism and a secondary actuator for controlling said primary actuator, a manually operable member coupled to said primary actuator for controlling the attitude of the craft in accordance with the magnitude and direction of the force applied to said member, resiliently centering means, a portion of which is resiliently coupled to said manually operable member including a signal generating means for providing a control signal in accordance with the magnitude and direction of the force applied to said manually operable member, and actuator control means responsive to the signals from said attitude reference means and from said resiliently coupled means for controlling the secondary actuator in accordance with a desired rate of change of craft attitude, said secondary actuator including means for supplying a feedback signal as a function of secondary actuator position to said actuator control means whereby the craft is controlled to a rate of attitude change proportional to the force applied to the manually operable member.

24. A system as claimed in claim 23 in which the resiliently coupled means includes a bungee, a portion of which is resiliently coupled to the manually operable member whereby artificial feel is provided as a function of displacement of the manually operable member.

25. A control system for aircraft for controlling the attitude control mechanism of the craft comprising reference means for providing a signal in accordance with deviations of the craft from a predetermined attitude, actuator means including a primary actuator for controlling said attitude control mechanism and a secondary actuator for controlling said primary actuator, a manually operable member coupled to said primary actuator for controlling the attitude of the craft in accordance with the magnitude and direction of the displacement of said member from a central position, means resiliently coupled to said manually operable member including a signal generating means for providing a control signal in accordance with the magnitude and direction of the force applied to said manually operable member, integrating means responsive to said control signal for producing a signal representative of the integral thereof, actuator control means responsive to the signals from said attitude reference means and said integrating means and operably coupled to said secondary actuator, and motive means coupled to position said resiliently coupled means, said secondary actuator including means for supplying a feedback signal to said actuator control means and to said motive means whereby the rate of craft attitude change is proportional to the force applied to the manually operable member.

26. A system as claimed in claim 25 in which the resiliently coupled means includes a bungee, a portion of which is resiliently coupled to the manually operable member whereby artificial feel is provided as a function of the displacement of the manually operable member.

27. An attitude control system for aircraft for controlling the attitude control mechanism thereof comprising actuator means having a primary actuator for controlling said attitude control mechanism and a secondary actuator in controlling relation to said primary actuator, a manually operable member connected to control said primary actuator, means resiliently connected to said member including signal generating means for providing a control signal representative of the magnitude and direction of the force applied to said member, means including attitude reference means and responsive to said control signal representative of craft deviation from a desired attitude, actuator control means responsive to said deviation signal for controlling said secondary actuator, said secondary actuator including means for providing a feedback signal in accordance with the movement thereof, said actuator control means being responsive to said feedback signal, and means responsive to said feedback signal for positioning said manually operable member in a direction to eliminate said deviation signal.

28. An attitude control system for aircraft comprising a craft attitude control mechanism, a manually operable member, means resiliently connected to said member including signal generating means having one portion directly connected to said member and another portion resiliently connected to said member for providing a control signal in accordance with the magnitude and direction of the force applied to said member, integrating means responsive to said control signal for providing a signal representative of the integral thereof, means including attitude reference means for providing a signal in accordance with deviations of the craft from a predetermined attitude, means responsive to said attitude signal and said integral signal for providing a signal representative of the difference therebetween, actuator means responsive to said difference signal and connected to control said attitude control mechanism in accordance therewith, and means responsive to the operation of a portion of said actuator means for positioning said manually operable member and said signal generating means through said resilient means in a direction to provide a change in craft attitude proportional to the force applied to the manually operable member.

29. A flight control system for an aircraft having an attitude control mechanism for controlling craft attitude and servomotor means for controlling said mechanism, the combination comprising manually operable means including means for directly controlling said attitude control mechanism, and resilient means controlled from said manual means for providing a first signal proportional to the force applied thereto, motive means for controlling said resilient means independently of said manually operable means, attitude responsive means including means for providing a second signal proportional to the rate of change of attitude of the craft, means responsive to said first and second signal for controlling said servomotor means in accordance with the difference therebetween, and means responsive to the operation of said servomotor means for controlling said motive means in a magnitude and direction to maintain said first signal substantially equal to said second signal.

References Cited in the file of this patent

UNITED STATES PATENTS

| | | |
|---|---|---|
| 2,443,192 | Moeller | June 15, 1948 |
| 2,451,263 | Webb | Oct. 12, 1948 |
| 2,479,549 | Ayres et al. | Aug. 23, 1949 |
| 2,639,108 | Feeney et al. | May 19, 1953 |
| 2,678,177 | Chenery et al. | May 11, 1954 |
| 2,680,579 | Hohenemser | June 8, 1954 |
| 2,695,145 | Lear et al. | Nov. 23, 1954 |
| 2,715,709 | Schreppel | Aug. 16, 1955 |
| 2,770,428 | Vogel | Nov. 13, 1956 |
| 2,797,882 | Servanty | July 2, 1957 |
| 2,823,879 | Smith et al. | Feb. 18, 1958 |
| 2,852,212 | Mallery et al. | Sept. 16, 1958 |
| 2,859,926 | Westbury | Nov. 11, 1958 |